United States Patent
Brugere et al.

(10) Patent No.: US 12,436,935 B1
(45) Date of Patent: Oct. 7, 2025

(54) SYSTEM AND METHOD FOR GROUNDING OUTPUTS IN TABULAR GENERATIVE ARTIFICIAL INTELLIGENCE

(71) Applicant: JPMorgan Chase Bank, N.A., New York, NY (US)

(72) Inventors: Ivan Brugere, Des Plaines, IL (US); Sanjay Kariyappa, Mountain View, CA (US); Shubham Sharma, Manhattan, NY (US); Freddy Lecue, Mamaroneck, NY (US); Giang Nguyen, Auburn, AL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/933,588

(22) Filed: Oct. 31, 2024

(51) Int. Cl.
  *G06F 16/22* (2019.01)
  *G06F 16/242* (2019.01)
  *G06F 16/2455* (2019.01)

(52) U.S. Cl.
  CPC ........ *G06F 16/2282* (2019.01); *G06F 16/243* (2019.01); *G06F 16/2455* (2019.01)

(58) Field of Classification Search
  None
  See application file for complete search history.

(56) References Cited

U.S. PATENT DOCUMENTS

| | | | | |
|---|---|---|---|---|
| 2020/0142987 A1* | 5/2020 | Grabs | ................. | G06F 16/2379 |
| 2020/0175008 A1* | 6/2020 | Bensberg | ............ | G06F 16/2455 |
| 2020/0364193 A1* | 11/2020 | Zhou | ................... | G06F 16/2423 |
| 2022/0222247 A1* | 7/2022 | Grabs | ................. | G06F 16/2379 |
| 2023/0035166 A1* | 2/2023 | Gottimukkala | ..... | G06F 16/2358 |
| 2023/0083420 A1* | 3/2023 | Sun | ..................... | G06F 11/3409 707/713 |

OTHER PUBLICATIONS

Giang Nguyen et al., "Interpretable Table Question Answering via Plans of Atomic Table Transformations", dated Sep. 26, 2024 (modified Dec. 4, 2024) ICLR 2025 Conference Submission.

* cited by examiner

*Primary Examiner* — Christopher J Raab
(74) *Attorney, Agent, or Firm* — GREENBLUM & BERNSTEIN, P.L.C.

(57) ABSTRACT

Various methods and processes, apparatuses or systems, and media for generating a grounded answer to a query using a corresponding table are disclosed. The present disclosure provides decomposing a complex query into natural-language sub-queries or steps, which are then translated into database manipulation commands to sequentially transform input table into intermediate or simplified tables, until the input table is simplified for performing a final decision query. Each of the sub-queries may be associated with corresponding intermediate or simplified tables to ground the sub-queries.

20 Claims, 11 Drawing Sheets

FIG. 7

Table: 1947 Kentucky Wildcats football team

| game | opponent | result | Wildcats_points | opponents |
|---|---|---|---|---|
| 1 | Ole miss | Loss | 7 | 14 |
| 2 | Cincinnati | Win | 20 | 0 |
| 3 | Xavier | Win | 20 | 7 |
| 4 | Georgia | Win | 26 | 0 |
| 5 | Vanderbilt | Win | 14 | 0 |
| 6 | Michigan State | Win | 7 | 6 |
| 7 | Alabama | Loss | 0 | 13 |
| 8 | West Virginia | Win | 15 | 6 |
| 9 | Evansville | Win | 36 | 0 |
| 10 | Tennessee | Loss | 6 | 13 |

FIG. 9

| Method | Accuracy (%) | Intermediate Table | Transformed by | Answered by | Interpretable |
|---|---|---|---|---|---|
| End-to-End QA | 70.45 | No | LLM | LLM | No |
| Few-Shot QA | 71.54 | No | LLM | LLM | No |
| Chain-of-Thought | 65.37 | No | LLM | LLM | No |
| Text-to-SQL | 64.71 | No | Program/system | Program/system | No |
| LPA | 68.9 | Yes | Program/system | Program/system | No |
| POQ | 78.31 | Yes | Program/system | Program/system | Yes |

FIG. 10
(PRIOR ART)

Table: stock index over 15 years

| year | priceline index | nasdaq index | s&p 500 index | rdg internet | lilly pharm | nvda | sftp pharm | vti index |
|---|---|---|---|---|---|---|---|---|
| 2009 | 100 | 165.47 | 153.58 | 195.83 | 200.32 | 177.01 | 264.96 | 132.64 |
| 2010 | 132.64 | 116.41 | 116 | 119.34 | 132.64 | 116.41 | 116 | 119.34 |
| 2011 | 100 | 165.47 | 153.58 | 195.83 | 200.32 | 177.01 | 264.96 | 132.64 |
| 2012 | 132.64 | 116.41 | 116 | 119.34 | 132.64 | 116.41 | 116 | 119.34 |
| 2013 | 248.53 | 165.47 | 153.58 | 216.54 | 198.18 | 277.56 | 313.45 | 195.83 |
| 2014 | 243.79 | 188.69 | 174.6 | 116.41 | 116 | 119.34 | 132.64 | 192.42 |
| 2015 | 272.59 | 200.32 | 177.01 | 264.96 | 272.59 | 200.32 | 177.01 | 264.96 |
| 2016 | 313.45 | 216.54 | 198.18 | 277.56 | 313.45 | 216.54 | 198.18 | 277.56 |
| 2017 | 132.64 | 116.41 | 116 | 119.34 | 132.64 | 116.41 | 116 | 119.34 |
| 2018 | 248.53 | 165.47 | 153.58 | 195.83 | 272.59 | 200.32 | 177.01 | 264.96 |
| 2019 | 243.79 | 188.69 | 174.6 | 192.42 | 243.79 | 188.69 | 174.6 | 192.42 |
| 2020 | 272.59 | 200.32 | 177.01 | 264.96 | 272.59 | 200.32 | 177.01 | 264.96 |
| 2021 | 313.45 | 216.54 | 198.18 | 277.56 | 313.45 | 216.54 | 198.18 | 277.56 |
| 2022 | 272.59 | 200.32 | 177.01 | 264.96 | 280.32 | 177.01 | 264.96 | 272.59 |
| 2023 | 313.45 | 216.54 | 198.18 | 277.56 | 313.45 | 216.54 | 198.18 | 277.56 |

SYSTEM AND METHOD FOR GROUNDING OUTPUTS IN TABULAR GENERATIVE ARTIFICIAL INTELLIGENCE

TECHNICAL FIELD

This disclosure generally relates to generating a grounded answer to a query using a corresponding table.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Table question-answering (Table QA) models enable users to swiftly retrieve the desired information within large and complex tables, commonly found in domain like finance, healthcare, and scientific research. Despite significant progress, existing Table QA models often struggle with complex queries and tables, and may be prone to hallucinations. A hallucination may refer to a response or output that is factually incorrect, nonsensical or inconsistent with the input prompt. A hallucination may occur when a model attempts to produce a coherent response by filling in gaps with plausible-sounding but incorrect information. Moreover, the reasoning process in many models remains a black box, making it difficult for users to understand how answers are derived and render its results unable to be validated. This lack of interpretability limit reliance and applicability of Table QA models, as hallucinated results may often go undetected due to the black box nature of such models.

Integration of a large language model (LLM) enabled complex reasoning in Table QA models. However, implementation of LLM led to its processes to be invisible to a user or a validating circuit or system, such that any errors may be hidden from discovery or analysis. For example, as illustrated in FIG. 11 the original table as illustrated in FIG. 10 is progressively transformed through several intermediate steps, which may be invisible to its users, each offering more clarity, until a final simplified table is presented to the LLM to ask for the final answer.

More specifically, a query inquiring 'what is the change in index for company ABC between 2015 and 2023' may be submitted for processing to the conventional Table QA model. In response to the submitted query, the conventional Table QA model may retrieve a table illustrated in FIG. 10, which illustrates stock index for company ABC over the past 15 years.

First, in response to the query, the conventional Table QA model, via an LLM, may execute a function to select a column for company ABC in operation 1101. Second, once the table is limited to the column for the company ABC, another function may be executed to select rows 7 and 13 in operation 1102. Lastly, based on the selected rows in response to the submitted query, the conventional Table QA model executes the final function in operation 1103 for answering the inputted query via the LLM. Referring to FIG. 10, the first selected row 7 corresponds to an index value of 272.59 for the company ABC and the second selected row 13 corresponds to an index value of 272.59 for the company ABC, resulting a predicted value of zero or 0 for the inputted query. However, in further review of FIG. 10, it is noted that the first select row 7 correctly corresponds to year 2015, but that the second selected row 13 incorrectly corresponds to year 2022, instead of year 2023 specified in the inputted query. However, at least since the conventional Table QA model operates in a black box nature, such that its processes are not visible to a user or a validator, incorrect prediction or function(s) performed for the query may not be easily uncovered until an error is discovered at a later downstream application, which may result in a stream of incorrectly generated data and application of such data prior to its discovery. Moreover, in view of the black box nature, even if the LLM hallucinates in generating a prediction, such errors may not be discovered in the conventional Table QA models.

Further, conventional integration of LLMs with the Table QA models are left with at least two challenges.

First, as queries grow more complex, such as when tables contain numerous rows and columns, or when queries involve multiple conditions, the reasoning process becomes increasingly opaque. For example, a chain-of-table model, which may be one of the conventional Table QA models, may arbitrarily selects rows using the f_select_row( )function, leading to the right answer for the wrong reason.

Secondly, answer generation provided by LLM relies on the black-box reasoning of a model, introducing another layer of opacity as to the exact mechanism through which the LLM arrives at the final answer remains unclear to users or other validating mechanisms.

Accordingly, due to the multiple layers of opacity provided through conventional integration of LLM with Table QA models, incorrect answers or hallucinations may often go undetected and there is no practical way to verify or validate whether a provided answer is a legitimate answer or hallucination, which limits reliance and applicability of Table QA models.

SUMMARY

The present disclosure, through one or more of its various aspects, embodiments, and/or specific features or sub-components, provides, among other features, a method for generating a grounded answer to a query using a corresponding table is provided. The method includes receiving, by a processor, the query, wherein the query is provided in a natural language form; receiving, by the processor, the corresponding table, wherein the corresponding table includes a plurality of rows and a plurality of columns; decomposing, by the processor using natural language processing, the query into a plurality of atomic steps provided in natural language form, wherein the plurality of atomic steps configured to be sequentially performed; converting, by the processor, the plurality of atomic steps into a plurality of database manipulation commands; executing, by the processor, a first database manipulation command of the plurality of database manipulation commands, wherein at least one of the plurality of database manipulation commands is configured to perform a table manipulation to generate an intermediate table that is used by another database manipulation command among the plurality of database manipulation commands; generating, by the processor and in response to the executing of the first database manipulation command, a first intermediate table; storing, in a memory, the first intermediate table in association with a corresponding atomic step among the plurality of atomic steps; determining, by the processor whether a second database manipulation command among the plurality of database manipulation commands is a last database manipulation command among the plurality of database manipulation commands; when the second database manipulation command is determined not to be the last database manipulation command: generating, by the processor and in response to the executing of the second database manipulation command and using the first intermediate table, a second intermediate table, and storing, in the memory, the second intermediate table in association with a corresponding atomic step among the plurality of atomic steps; when the second database manipulation command is determined to be the last database manipulation command: setting, by the processor, the first intermediate table as a final intermediate table, and executing, by the processor, a decision query based on the final intermediate table for generating an answer for the query received; and outputting, by the processor, the generated answer along with at least the first intermediate table and the corresponding atomic step.

In some embodiments, each of the plurality of atomic steps is constrained to be limited to a single table manipulation operation or condition.

In some embodiments, each of the plurality of data manipulation commands is a Structured Query Language (SQL) command.

In some embodiments, the other database manipulation command is subsequent to the at least one of the plurality of database manipulation commands.

In some embodiments, the converting of the plurality of atomic steps into the plurality of database manipulation commands is performed using a large language model.

In some embodiments, in the outputting, the first intermediate table is provided with highlighting of at least one cell.

In some embodiments, in the outputting, each of the plurality of atomic steps is grounded with an intermediate table.

In some embodiments, the first intermediate table includes a modification of the corresponding table provided to the processor.

In some embodiments, the final intermediate table includes less data than the corresponding table provided to the processor.

In some embodiments, the executing of the first database manipulation command is performed using a lightweight SQL engine.

In some embodiments, the outputting includes generating of an attribution map over at least the first intermediate table to indicate contribution in the generating of the answer.

In some embodiments, the attribution map includes highlighting of at least one row.

In some embodiments, the attribution map includes at least highlighting of at least one cell.

In some embodiments, the attribution map uses different highlights to indicate varying levels of importance to the generating of the answer.

In some embodiments, the lightweight SQL engine includes a Python sqlite3 package.

In some embodiments, the corresponding table is identified based on the query.

In some embodiments, the plurality of atomic steps includes at least three atomic steps.

In some embodiments, each of the plurality of database manipulation commands, except for the last database manipulation command, generates an intermediate table or further simplifies preceding intermediate table.

In some embodiments, a system for generating a grounded answer to a query using a corresponding table is disclosed. The system may include: a processor; and a memory operatively connected to the processor via a communication interface, the memory storing computer readable instructions, when executed, causes the processor to perform: receiving the query, wherein the query is provided in a natural language form; receiving the corresponding table, wherein the corresponding table includes a plurality of rows and a plurality of columns; decomposing, using natural language processing, the query into a plurality of atomic steps provided in natural language form, wherein the plurality of atomic steps configured to be sequentially performed; converting the plurality of atomic steps into a plurality of database manipulation commands; executing a first database manipulation command of the plurality of database manipulation commands, wherein at least one of the plurality of database manipulation commands is configured to perform a table manipulation to generate an intermediate table that is used by another database manipulation command among the plurality of database manipulation commands; generating, in response to the executing of the first database manipulation command, a first intermediate table; storing the first intermediate table in association with a corresponding atomic step among the plurality of atomic steps; determining whether a second database manipulation command among the plurality of database manipulation commands is a last database manipulation command among the plurality of database manipulation commands; when the second database manipulation command is determined not to be the last database manipulation command: generating, in response to the executing of the second database manipulation command, a second intermediate table, and storing the second intermediate table in association with a corresponding atomic step among the plurality of atomic steps; when the second database manipulation command is determined to be the last database manipulation command: setting the first intermediate table as a final intermediate table, and executing a decision query based on the final intermediate table for generating an answer for the query received; and outputting the generated answer along with at least the first intermediate table and the corresponding atomic step.

In some embodiments, a non-transitory computer readable medium configured to store instructions for generating a grounded answer to a query using a corresponding table is disclosed. The instructions, when executed, may cause a processor to perform the following: receiving the query, wherein the query is provided in a natural language form; receiving the corresponding table, wherein the corresponding table includes a plurality of rows and a plurality of columns; decomposing, using natural language processing, the query into a plurality of atomic steps provided in natural language form, wherein the plurality of atomic steps configured to be sequentially performed; converting the plurality of atomic steps into a plurality of database manipulation commands; executing a first database manipulation command of the plurality of database manipulation commands, wherein at least one of the plurality of database manipulation commands is configured to perform a table manipulation to generate an intermediate table that is used by another database manipulation command among the plurality of database manipulation commands; generating, in response to the executing of the first database manipulation command, a first intermediate table; storing the first intermediate table in association with a corresponding atomic step among the plurality of atomic steps; determining whether a second database manipulation command among the plurality of database manipulation commands is a last database manipulation command among the plurality of database manipulation commands; when the second database manipulation command is determined not to be the last database manipulation command: generating, in response to the executing of the second database manipulation command, a second intermediate table, and storing the second intermediate table in association with a corresponding atomic step among the plurality of atomic steps; when the second database manipulation command is determined to be the last database manipulation command: setting the first intermediate table as a final intermediate table, and executing a decision query based on the final intermediate table for generating an answer for the query received; and outputting the generated answer along with at least the first intermediate table and the corresponding atomic step.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 illustrates an example query along with a corresponding table.

FIG. 9 illustrates experimental results of a POQ method in comparison with conventional Table QA models in accordance with an embodiment.

FIG. 10. Illustrates a table processed by a conventional Table QA model.

DETAILED DESCRIPTION

Figure 1:
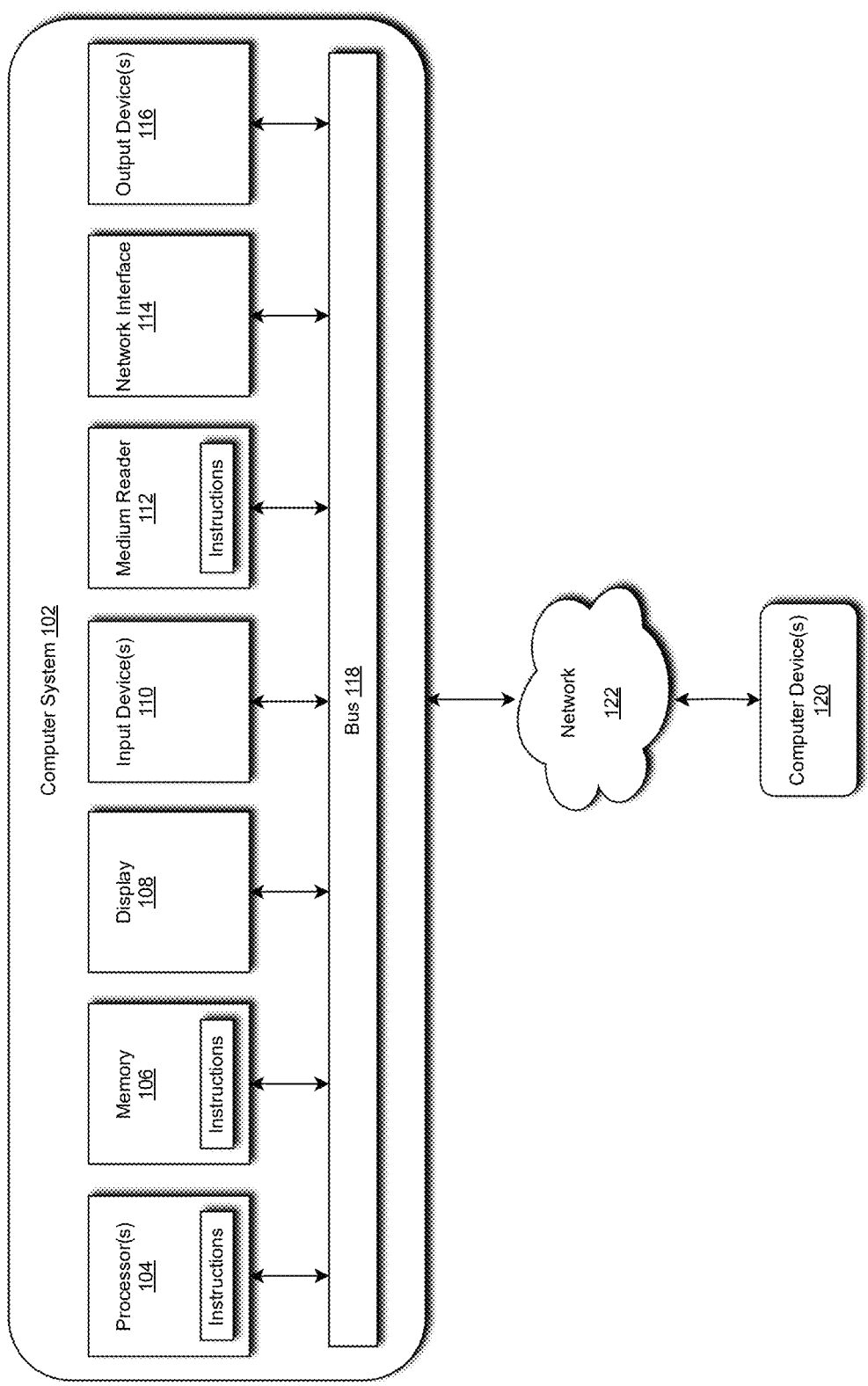
FIG. 1 illustrates a computer system for implementing a plan-of-query (POQ) system in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

As noted above, conventional Table QA models, which rely on LLMs, may be prone to hallucinations while users and validators are left blind to internal logic steps or processes performed by the respective LLMs. As a result, outputs from conventional Table QA models may be incapable of proper validation by users or validators, such that downstream processes and components may often be unaware of such hallucinations provided by the conventional Table QA models and outputs from the conventional Table QA models may continually be utilized, leading to generation of a stream of inaccurate information.

In consideration of the above noted technological drawbacks and limitations, exemplary aspects of the present disclosure provide a novel Plan-of-Query (POQ) system and method specifically configured for providing interpretability or visibility of its internal processes for validation, and grounding its processes with intermediate outputs or tables to reduce or prevent hallucinations. According to exemplary aspects, the novel POQ system may decompose a complex query into atomic natural-language sub-queries or atomic steps, which are then translated into database manipulation commands to sequentially transform input table into intermediate or simplified tables, until the input table is iteratively simplified for performing a final decision query. Each of the atomic steps may be associated with corresponding intermediate or simplified tables to ground the atomic steps for avoiding hallucinations, while providing insights into the logic steps performed with supporting evidentiary data to allow interpretation or visibility to its internal processing, which were unavailable in conventional Table QA models. Accordingly, based on the above noted features, hallucinations provided in LLMs may be reduced or prevented against, and processes for providing an answer to a query may be visible with supporting evidence for validation.

FIG. 1 is a system 100 for use in implementing a Plan-of-Query (POQ) system in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 may be a personal computer. However, those skilled in the art appreciate that, in alternative embodiments of the present application, the computer device 120 may also be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the POQ module implemented by the system 100 may allow for a POQ module configured to perform decomposing a query into multiple sub-queries that are configured to be sequentially performed for generating of intermediate simplified tables, which are iteratively simplified until a final query is performed, and associating each of the sub-queries with corresponding intermediate simplified tables for generating a grounded answer to the query.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionalities as described herein, and a processor described herein may be used to support a virtual processing environment.

Figure 2:
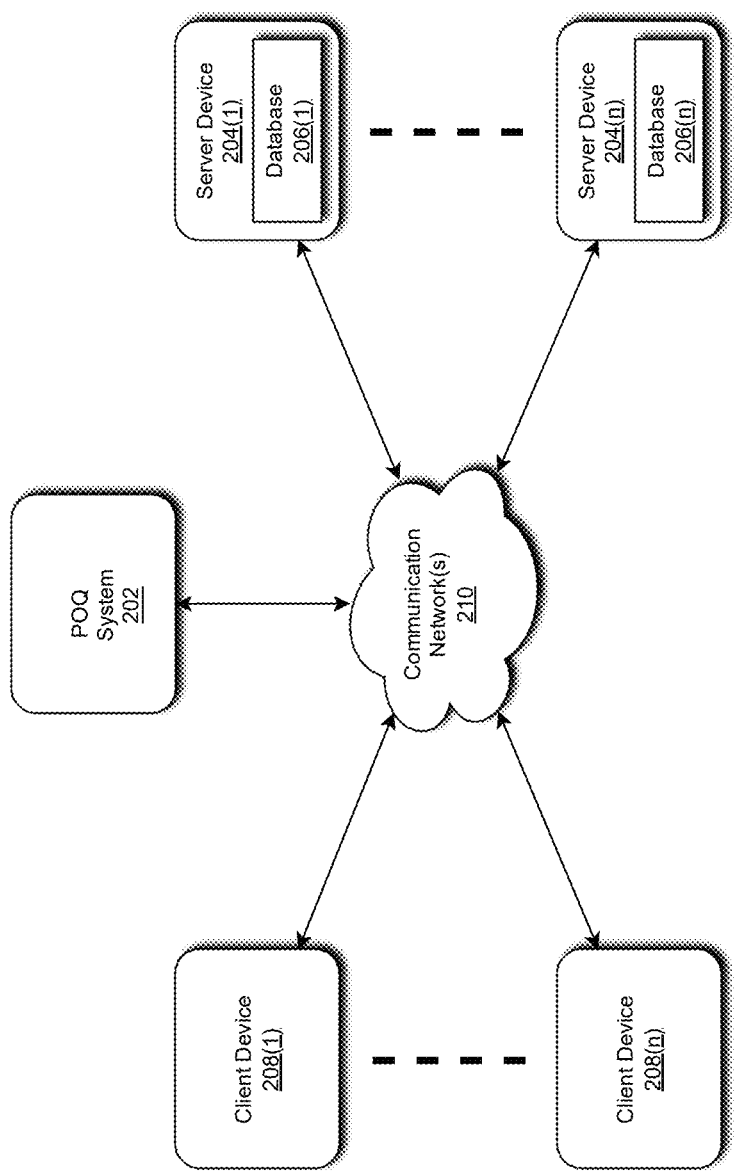
FIG. 2 illustrates a diagram of a network environment for implementing a POQ system in accordance with an embodiment.

Referring to FIG. 2, a schematic of a network environment 200 for implementing a POQ system is illustrated.

In some embodiments, the above-described problems associated with conventional Table QA models may be overcome by implementing a POQ system 202 as illustrated in FIG. 2 that may be configured for implementing a POQ module configured for receiving a query, in which the query is provided in a natural language form; receiving a table corresponding to the query, in which the corresponding table includes a plurality of rows and a plurality of columns; decomposing, using natural language processing, the query into a plurality of atomic steps provided in natural language form, in which the plurality of atomic steps configured to be sequentially performed; converting the plurality of atomic steps into a plurality of database manipulation commands; executing a first database manipulation command of the plurality of database manipulation commands, in which at least one of the plurality of database manipulation commands is configured to perform a table manipulation to generate an intermediate table that is used by another database manipulation command among the plurality of database manipulation commands; generating, in response to the executing of the first database manipulation command, a first intermediate table; storing the first intermediate table in association with a corresponding atomic step among the plurality of atomic steps; determining whether a second database manipulation command among the plurality of database manipulation commands is a last database manipulation command among the plurality of database manipulation commands; when the second database manipulation command is determined not to be the last database manipulation command: generating, in response to the executing of the second database manipulation command, a second intermediate table, and storing the second intermediate table in association with a corresponding atomic step among the plurality of atomic steps; when the second database manipulation command is determined to be the last database manipulation command: setting the first intermediate table as a final intermediate table, and executing a decision query based on the final intermediate table for generating an answer; and outputting the generated answer along with at least the first intermediate table and the corresponding atomic step.

The POQ system 202 may include one or more computer system 102s, as described with respect to FIG. 1, which in aggregate provides the necessary functions.

The POQ system 202 may store one or more applications that can include executable instructions that, when executed by the POQ system 202, cause the POQ system 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the POQ system 202 itself, may be located in virtual server(s) running in a cloud-based computing environment rather than being tied to one or more specific physical network computing devices. Also, the application(s) may be running in one or more virtual machines (VMs) executing on the POQ system 202. Additionally, in one or more embodiments of this technology, virtual machine(s) running on the POQ system 202 may be managed or supervised by a hypervisor.

In the network environment 200 of FIG. 2, the POQ system 202 may be coupled to a plurality of server devices 204(1)-204(n) that hosts a plurality of databases 206(1)-206(n), and also to a plurality of client devices 208(1)-208(n) via communication network(s) 210. A communication interface of the POQ system 202, such as the network interface 114 of the computer system 102 of FIG. 1, operatively couples and communicates between the POQ system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the POQ system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The POQ system 202 may be a standalone device or integrated with one or more other devices or apparatuses, such as one or more of the server devices 204(1)-204(n), for example. In one particular example, the POQ system 202 may be hosted by one of the server devices 204(1)-204(n), and other arrangements are also possible. Moreover, one or more of the devices of the POQ system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the POQ system 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

In some embodiments, the client devices 208(1)-208(n) in this example may include any type of computing device that can facilitate the implementation of the POQ system 202 that may efficiently provide a POQ module configured for receiving a query, in which the query is provided in a natural language form; receiving a table corresponding to the query, in which the corresponding table includes a plurality of rows and a plurality of columns; decomposing, using natural language processing, the query into a plurality of atomic steps provided in natural language form, in which the plurality of atomic steps configured to be sequentially performed; converting the plurality of atomic steps into a plurality of database manipulation commands; executing a first database manipulation command of the plurality of database manipulation commands, in which at least one of the plurality of database manipulation commands is configured to perform a table manipulation to generate an intermediate table that is used by another database manipulation command among the plurality of database manipulation commands; generating, in response to the executing of the first database manipulation command, a first intermediate table; storing the first intermediate table in association with a corresponding atomic step among the plurality of atomic steps; determining whether a second database manipulation command among the plurality of database manipulation commands is a last database manipulation command among the plurality of database manipulation commands; when the second database manipulation command is determined not to be the last database manipulation command: generating, in response to the executing of the second database manipulation command, a second intermediate table, and storing the second intermediate table in association with a corresponding atomic step among the plurality of atomic steps; when the second database manipulation command is determined to be the last database manipulation command: setting the first intermediate table as a final intermediate table, and executing a decision query based on the final intermediate table for generating an answer; and outputting the generated answer along with at least the first intermediate table and the corresponding atomic step.

The client devices 208(1)-208(n) may run interface applications, such as standard web browsers or standalone client applications, which may provide an interface to communicate with the POQ system 202 via the communication network(s) 210 in order to communicate user requests. The client devices 208(1)-208(n) may further include, among other features, a display device, such as a display screen or touchscreen, and/or an input device, such as a keyboard, for example.

Although the network environment 200 with the POQ system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the POQ system 202, the server devices 204(1)-204(n), or the client devices 208(1)-208(n), for example, may be configured to operate as virtual instances on the same physical machine. For example, one or more of the POQ system 202, the server devices 204(1)-204(n), or the client devices 208(1)-208(n) may operate on the same physical device rather than as separate devices communicating through communication network(s) 210. Additionally, there may be more or fewer POQ system s 202, server devices 204(1)-204(n), or client devices 208(1)-208(n) than illustrated in FIG. 2. In some embodiments, the POQ system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
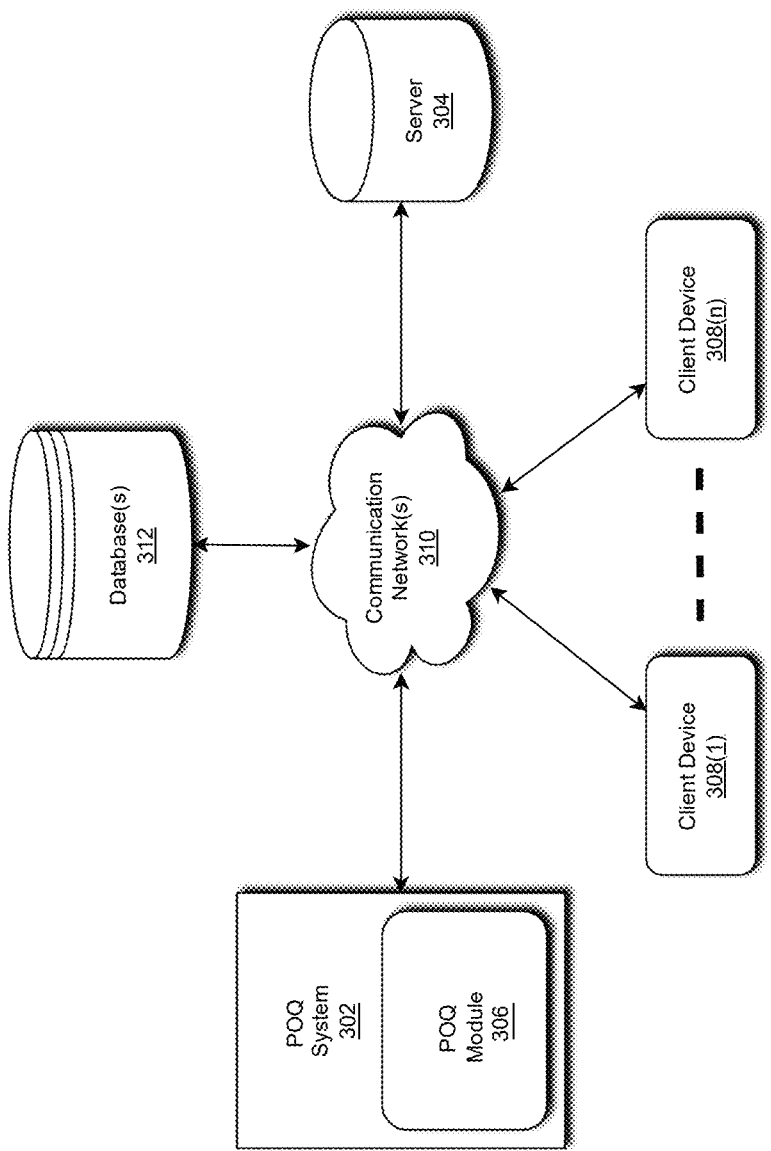
FIG. 3 illustrates a system configuration diagram for implementing a POQ system in accordance with an embodiment.

FIG. 3 illustrates a system diagram for implementing a POQ system in accordance with an embodiment.

As illustrated in FIG. 3, the system 300 may include a POQ system 302 within which a POQ module 306 is embedded, a server 304, a database(s) 312, a plurality of client devices 308(1) . . . 308(n), and a communication network 310.

In some embodiments, the POQ system 302 including the POQ module 306 may be connected to the server 304, and the database(s) 312 via the communication network 310. The POQ system 302 may also be connected to the plurality of client devices 308(1) . . . 308(n) via the communication network 310, but the disclosure is not limited thereto. The database(s) 312 may include one or more rule databases.

In an embodiment, the POQ system 302 is described and shown in FIG. 3 as including the POQ module 306, although it may include other rules, policies, modules, databases, or applications, for example. In some embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store tables, atomic steps generated from queries, intermediate output or tables, corresponding attribution maps, association between one or more atomic steps and corresponding intermediate output or tables, and corresponding table attributes.

In some embodiments, the POQ module 306 may be configured to receive real-time feed of data from the plurality of client devices 308(1) . . . 308(n) and secondary sources via the communication network 310.

The POQ module 306 may be configured to perform decomposing a query into multiple sub-queries that are configured to be sequentially performed for generating of intermediate simplified tables, which are iteratively simplified until a final query is performed, and associating each of the sub-queries with corresponding intermediate simplified tables for generating a grounded answer to the query.

The plurality of client devices 308(1) . . . 308(n) are illustrated as being in communication with the POQ system 302. In this regard, the plurality of client devices 308(1) . . . 308(n) may be "clients" (e.g., customers) of the POQ system 302 and are described herein as such. Nevertheless, it is to be known and understood that the plurality of client devices 308(1) . . . 308(n) need not necessarily be "clients" of the POQ system 302, or any entity described in association therewith herein. Any additional or alternative relationship may exist between either or both of the plurality of client devices 308(1) . . . 308(n) and the POQ system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(n) may communicate with the POQ system 302 via broadband or cellular communication. Of course, these embodiments are merely exemplary and are not limiting or exhaustive.

The client devices 308(1) . . . 308(n) may be the same or similar to any one of the client devices 208(1)-208(n) as described with respect to FIG. 2, including any features or combination of features described with respect thereto. The POQ system 302 may be the same or similar to the POQ system 202 as described with respect to FIG. 2, including any features or combination of features described with respect thereto.

Figure 4:
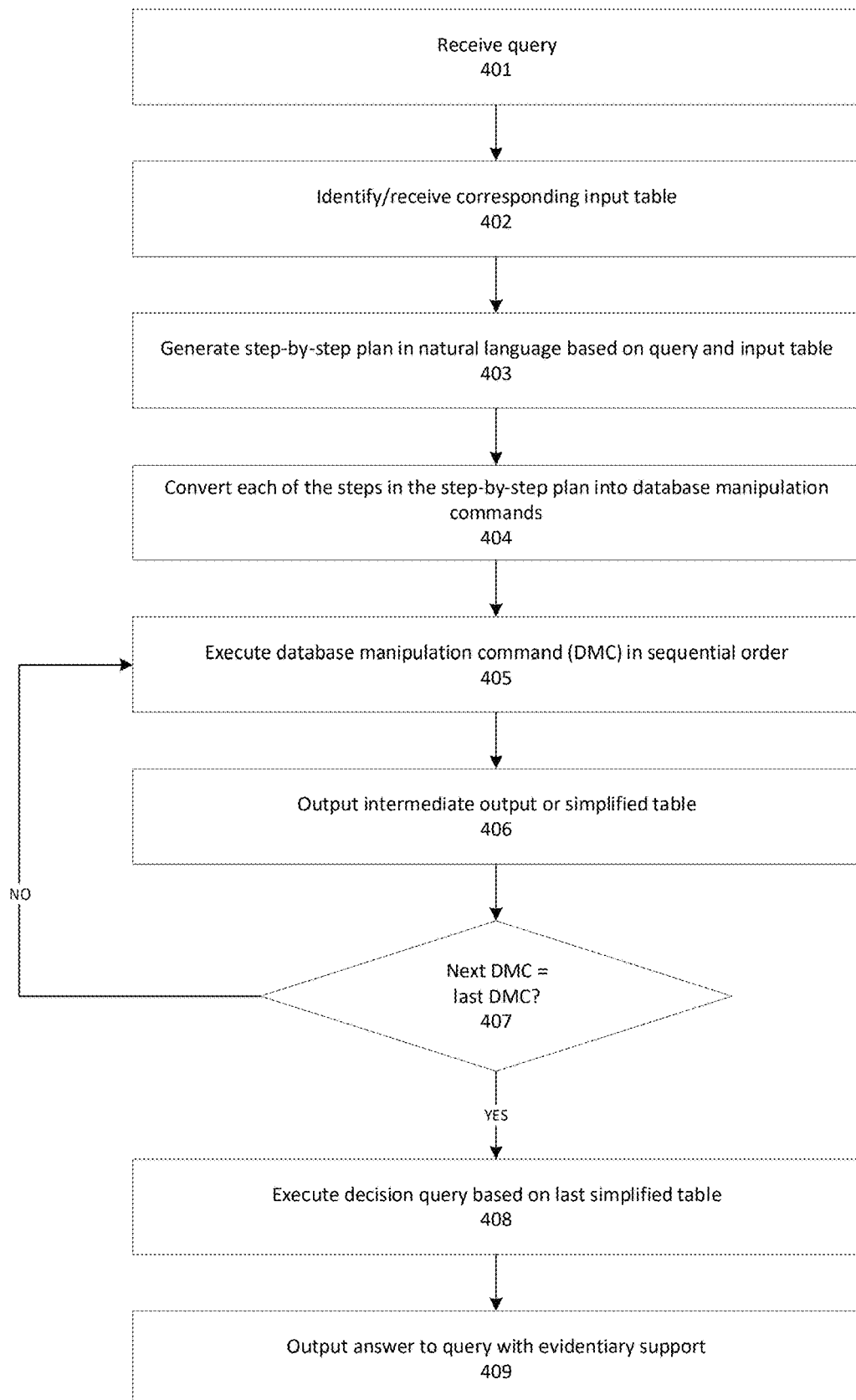
FIG. 4 illustrates a POQ method for generating a table grounded answer that is capable of being validated to a query in accordance with an embodiment.

FIG. 4 illustrates a POQ method for generating a table grounded answer that is capable of being validated to a query in accordance with an embodiment.

According to exemplary aspects, in view of the technical limitations associated with conventional integration of LLMs with the Table QA models, non-limiting exemplary aspects of the present disclosure provide a novel method that breaks down or decomposes the original query into simple natural language sub-queries, which may be converted into database manipulation commands, such as Structured Query Language (SQL) commands. For example, steps like Select rows where or Select column may be translated into database manipulation commands that are executed sequentially for generation of simplified or intermediate tables. This structured approach may ensure that each transformation is explicitly traceable and rational, thus, preventing from arbitrary selection of irrelevant data. According to exemplary aspects, the novel method may be referred to as the POQ method. Although SQL is utilized in the present disclosure, aspects of the present disclosure are not limited thereto, such that other suitable query language may be utilized.

Moreover, non-limiting exemplary aspects of the present disclosure are directed to addressing the opacity in the conventional Table QA models, where answer generation often relies on the black-box reasoning of the LLMs. More specifically, instead of depending on black-box LLM reasoning, non-limiting exemplary aspects of the present disclosure may provide generating a final answer through a transparent, database manipulation commands based process, such as Text-to-SQL. However, while conventional Text-to-SQL generates a SQL command to respond to the received query, it may require domain expertise to comprehend and may become unintelligible when handling complex queries, more likely producing inexecutable or incorrect programs. In contrast, non-limiting exemplary aspects, the method of FIG. 4 may decompose the query into a sequence of simple, atomic steps that are individually translated into discrete SQL commands. Such a process not only simplifies the translation process but also ameliorate interpretability by allowing users to follow the reasoning step-by-step.

Figure 6:
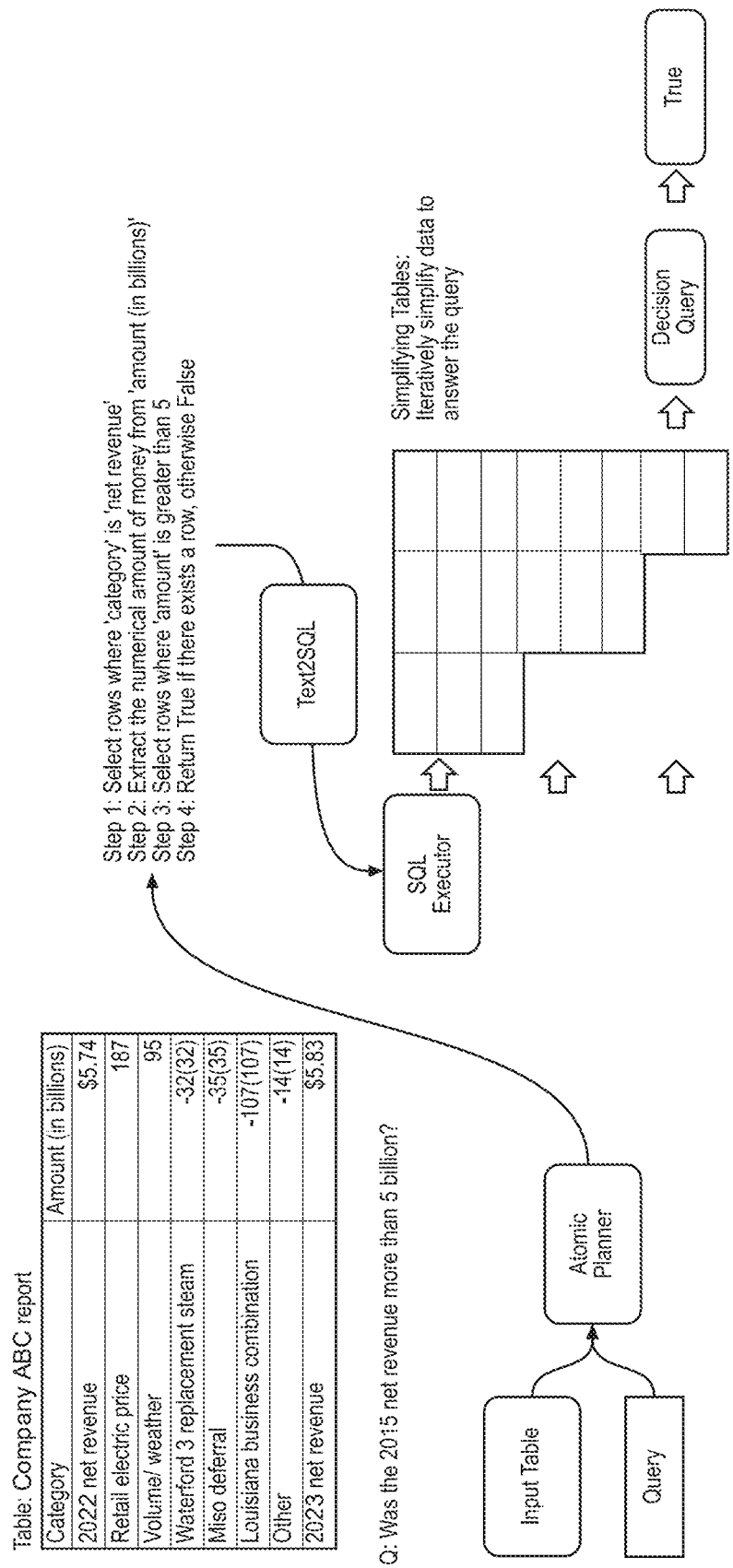
FIG. 6 illustrates another system flow of a POQ system for generating a table grounded answer that is capable of being validated to a query in accordance with an embodiment.

In operation 401, a query is received. According to exemplary aspects, the query may be received in a natural language form by a POQ module or system. In an example, the POQ module or system may be capable of natural language processing. For example, the query may seek a true or false determination for a particular statement, such as "[t]he wildcats kept the opposing team scoreless in 4 games" as illustrated in FIG. 7, or seek an output for an inquiry, such as "[w]as the 2023 net revenue more than 5 billion" as illustrated in FIG. 6. Although couple of queries are presented herein, aspects of the present disclosure are not limited thereto, such that queries seeking a particular numerical or text value, or a natural language response may also be submitted. Moreover, although queries in natural language form have been provided as examples, aspects of the present disclosure are not limited thereto, such that queries may be submitted in a formalized program language, numerical format or any other structural format.

In operation 402, a table corresponding to the inputted query may be inputted to the POQ module or identified by the POQ module based on the received query. For example, in response to the query provided in FIG. 7, a table for Kentucky wildcats football team may be identified in or retrieved from a centralized or local database by the POQ module. Alternatively, the respective table may be inputted to the POQ module.

As exemplarily illustrated in FIG. 7, the table corresponding to the received query may include multiple columns and rows along with corresponding header information. Referring to FIG. 7, column headers for the table for Kentucky wildcats football team may include a game number labeled as "game", opponent name labeled as "opponent", result of game labeled as "result", points scored by the wildcats labeled as "wildcat_points" and points scored by the opposing team labeled as "opponents".

In another example, in FIG. 6, the table corresponding to the received query may include two columns with multiple rows with corresponding information. Referring to the table of FIG. 6, the table may be a report for company ABC for year 2023. The table in FIG. 6 has two column headers, one column header indicating a "category" value, and another column header indicating an "amount (in billions)". For the "category" column, the following row values are listed: 2022 net revenue, retail electric price, volume/weather, Waterford 3 replacement steam, miso deferral, Louisiana business combination, other and 2023 net revenue.

In operation 403, step-by-step plan in natural language based on the query and input table may be generated by the POQ module, which may incorporate an atomic planner, with natural language processing capabilities. According to exemplary aspects, the query may be broken down or decomposed into discrete singular steps in view of content included in the respective table. Moreover, the discrete singular steps may be sequentially arranged, such that a subsequent step may perform its processing based on an intermediate output provided by a preceding step. For example, if a query requires a number of discrete operations to be sequentially performed in view of the query and the content included in the respective table, the step-by-step plan may include a number of steps corresponding to the number of discrete operations required. In an example, the atomic planner may leverage a programming aided table transformations using programming languages, such as SQL. However, aspects of the present disclosure are not limited thereto, such that suitable artificial intelligence (AI) or machine learning (ML) algorithm or models may be leveraged or utilized.

According to exemplary aspects, generation of the step-by-step plan may involve decomposing a complex query into a number of sub-problems or sub-processes that may be answered or executed using the identified table. Moreover, each of the sub-problems or sub-processes may be constrained to be limited to a single table manipulation operation or condition for ensuring clarity and to avoid potential hallucinations. By breaking down or decomposing a complex query into multiple database manipulation commands, such as SQL commands. In this regards, the decomposing or breaking down of the complex query into multiple database manipulation commands may remove or eliminate a need for more powerful text-to-SQL (or other database manipulation command) models for reducing CPU power utilization, while achieving superior performance, such as accuracy, as exemplarily illustrated in FIG. 9. Further, each of the sub-problems or sub-processes included in the step-by-step plan may be provided and stored in natural language for verification or validations, by humans and/or computing components.

Moreover, each of the database manipulation commands stemming from a query and configured to be sequentially executed, except for the last database manipulation command, may generate an intermediate output or table. For example, a first database manipulation command may use the received table for generating a first intermediate output or table. A second database manipulation command, that is executed subsequent to the first database manipulation command, may use the first intermediate output or table to generate a second database manipulation command. If a third database manipulation command is the last or final database manipulation command, the third database manipulation command may execute a decision query based on the last intermediate output or table, which in this case will be the second intermediate output or table.

Further to the above, one or more of the first and second intermediate outputs or tables may include attribution maps. More specifically, rows, columns, and cells of intermediate tables that contribute to the final answer may be highlighted in the attribution maps. Moreover, the highlighting may be provided in different colors to distinguish various levels of importance and/or contribution. For example, one color may be used to indicate that relevant rows contain context of the decision making process, whereas another color may be used to pinpoint specific cells that directly influence a prediction of the POQ system.

As exemplarily illustrated in FIG. 9, the POQ method or module results in an accuracy percentage of 78.31% with respect to providing a correct answer to an inputted query. In contrast, conventional QA table models or methods of End-to-End QA results in an accuracy of 70.45%, Few-Shot QA results in an accuracy of 71.54%, Chain-of-Thought results in an accuracy of 65.37%, Text-to-SQL results in an accuracy of 64.71% and LPA results in an accuracy of 68.9%. Moreover, conventional QA table models or methods of End-to-End QA, Few-Shot QA, Chain-of-Thought and Text-to-SQL do not provide an intermediate table, leaving users or validators unable to confirm intermediate steps performed in arriving at the final answer. In contrast, presence of intermediate tables provided by the POQ method may indicate exactly which cells are used for the final prediction or answer. As a result, the POQ method may allow users or validating systems to follow the reasoning process at a deep level, understanding how specific table cells and transformations lead to the final answer or prediction. In addition to the above, conventional QA table models or methods of End-to-End QA, Few-Shot QA, Chain-of-Thought, Text-to-SQL and LPA's results are not interpretable or even visible to a user or validating systems. In contrast, interpretability provided by POQ method may display the step-by-step plan generated from the received query in natural language to allow machine-logic interpretation to users or validating systems.

For example, with respect to the table of FIG. 6, the atomic planner may generate four discrete steps for providing an answer to the query received in operation 401. More specifically, for responding to the query of "[w]as the 2023 net revenue more than 5 billion," the atomic planner determines that four discrete and sequential steps are required. First step involves a selection of rows where "category" is "net revenue". Second step involves extracting of numerical amount of money from the "amount (in billions)" column. Third step involves selecting rows where the corresponding values for the "amount (in billions)" is greater than 5. Last step involves returning a value of "True" if there exists a row where the corresponding values for the "amount (in billions)" is greater than 5, and returning a value of "False" if no such row exists.

In another example, with respect to table of FIG. 7, the atomic planner may generate three discrete steps for providing an answer to the query received in operation 401. More specifically, for responding to the query regarding truth of the statement "[t]he wildcats kept the opposing team scoreless in 4 games," the atomic planner determines that three discrete and sequential atomic steps or sub-queries are required. As exemplarily illustrated in FIG. 8, the first step involves ordering the table of FIG. 7 in ascending order. Second step involves selecting rows where "opponents" indicating score of the opposing team equals to zero or 0. Third step involves using a conditional logic, such as a "CASE" statement, to return a value of "TRUE" if the number of rows in the second step equals to 4, and return a value of "FALSE" if the number of rows in the second step equals to a value different from 4.

In operation 404, for each of the atomic steps generated for generating an answer for the inputted query is converted into database manipulation commands, such as SQL commands. The text to database manipulation commands may involve, without limitation, normalizing, tokenization, part-of-speech tagging, named entity recognition, and parsing.

Normalizing may reduce randomness of a text and to make it more consistent with a predefined format, and may include stemming and lemmatization, in which stemming may cut words in a text down to root words or stems to prepare for processing. Lemmatization, on the other hand, may refer to a process of using contextual analysis to covert a word to its base form for easier search or joining with other words in a sentence. In an example, "surfing" can be lemmatized to "surf". Tokenization may refer to a process of breaking down text down into words, which may be referred to as tokens. According to exemplary aspects, tokens may be words, phrases or other units of text. Part-of-speech tagging may assign a part-of-speech tag to each token in a text sequence. The part-of-speech tags indicate the grammatical role of each token in the text. For example, the word "book" may have the "noun" tag, whereas the word of "ready" may have the "verb" tag. Named entity recognition may involve identifying named entities in a text and classifying the named entities into one or more predefined categories, such as person names, organizations or locations. Lastly, parsing may refer to a process of analyzing a text or sentence to determine its grammatical structure. Parsing may be used to understand the meaning of a text or sentence. For example, a parser may analyze a sentence to determine the noun and verb phrases representing subject, verb and object. The information retrieved after parsing is then represented through syntactic mapping, which may aid in translating text to database manipulation commands.

In an example, database manipulation commands may include SQL commands. According to exemplary aspects, SQL commands may be utilized to store, manipulate and retrieve datasets from relational database systems. However, aspects of the present disclosure are not limited thereto, such that SQL alternatives, such as MariaDB, PRQL, GraphQL, Gremlin, Malloy, Basis, N1QL and the like may be utilized.

Figure 8:
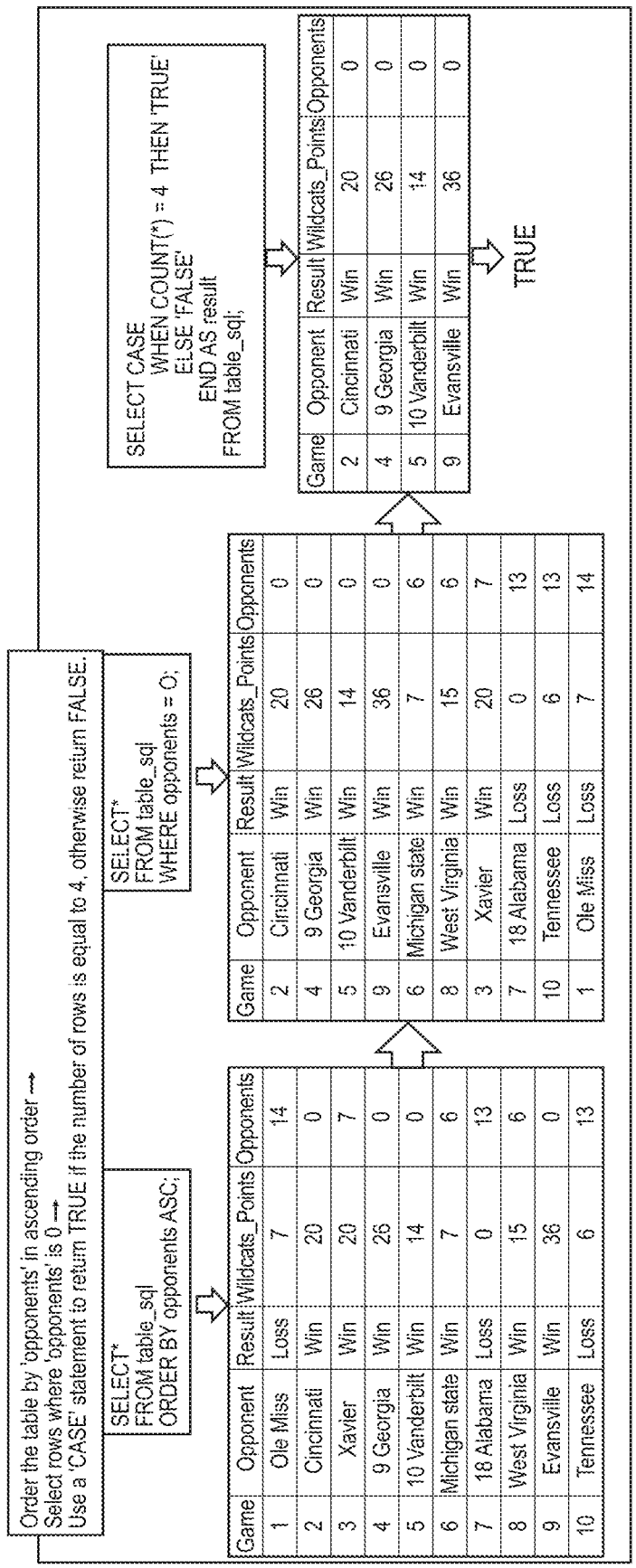
FIG. 8 illustrates a process flow for performing a POQ method based on the exemplary query and the corresponding table in FIG. 7 in accordance with an embodiment.
Figure 11:
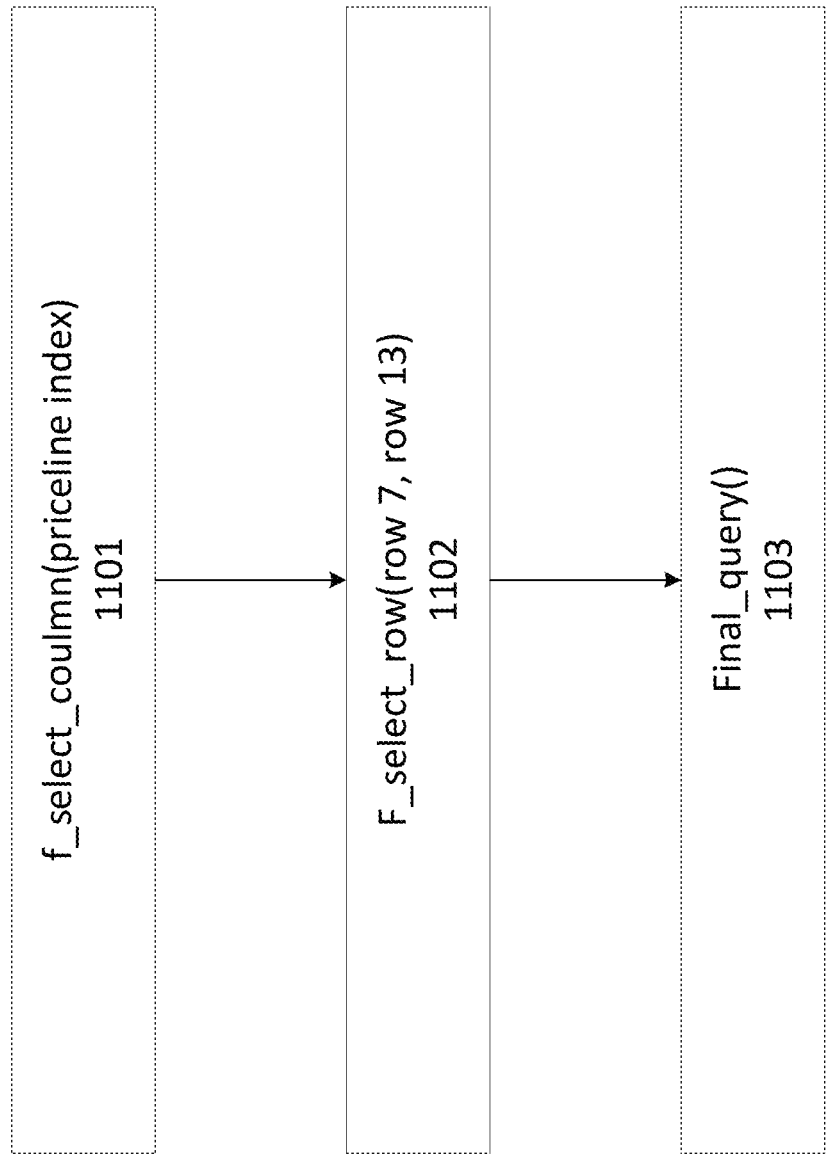
FIG. 11 illustrates a method utilized by conventional Table QA model for generating an answer to a query presented in FIG. 10.

Referring to FIG. 8, the first step of ordering the table of FIG. 7 by column header "opponents" in ascending order may be converted to the following SQL command:
SELECT *
FROM table_sql
ORDER BY opponents ASC;

The second step of selecting of rows where the column header "opponents" is 0 may be converted to the following SQL command:
SELECT *
FROM table_sql
WHERE opponents=0;

The third step of using a conditional statement to return a value of "TRUE" if the number of rows in the second step equals to 4, and return a value of "FALSE" if the number of rows in the second step equals to a value different from 4, may be converted to the following SQL command:
SELECT CASE
  WHEN COUNT (*)=4 THEN 'TRUE'
  ELSE 'FALSE'
END AS result
FROM table_sql;

In operation 405, a converted database manipulation command, among a set of set of converted database manipulation commands, is executed. According to exemplary aspects, the set of converted database manipulation commands is configured to be executed in a sequential manner, where a subsequent database manipulation command relies on or utilizes an output of a preceding database manipulation command. Once the database manipulation command is executed in operation 405, an intermediate output is generated in operation 406. In an example, the intermediate output may be a simplified or modified table based on an inputted table. For example, a first database manipulation command may utilize the initially received table for generating a first intermediate or simplified table, which may then be utilized by a second database manipulation command. In operation 407, a determination is made as to whether a subsequent data manipulation command to be executed is the last database manipulation command among the set of the converted database manipulation commands. If the subsequent database manipulation command to be executed is determined not to be the last in the set of converted database manipulation commands, operation 405 is executed again for the subsequent database manipulation command using the intermediate output, such as the simplified table, generated in operation 406 based on the preceding database manipulation command. More specifically, a sequential database manipulation command utilizes an output of a preceding database manipulation command.

However, if the subsequent database manipulation command is determined to be the last in the set of converted database manipulation commands in operation 407, then the method proceeds to operation 408 for executing a decision query based on the last intermediate output or simplified table. More specifically, if the subsequent database manipulation command is determined to be the last database manipulation command, the previous intermediate output or simplified table may be set as the final or last intermediate output or simplified table, on which the decision query may be executed. According to exemplary aspects, the decision query may refer to the last database manipulation command among the set of converted database manipulation commands. The decision query or the last database manipulation command may be performed on the last intermediate output for generating an answer to the query received in operation 401.

For example, in a set of three database manipulation commands, a first database manipulation command may be executed on the inputted table to generate a first intermediate output, such as a first simplified table. In a subsequent step, a second database manipulation command may be executed on the first intermediate output to generate a second intermediate output. In a subsequent step, a third database manipulation command may be executed on the second intermediate output to generate a third intermediate output. The above noted sequence of steps or operations may be continued until the last database manipulation command is reached. However, if the third database manipulation command is the last database manipulation command among the set of database manipulation commands, a final output responding to the query received in operation 401 may be generated in response to the third database manipulation command based on the second intermediate output.

Accordingly, based on the above noted sequential database manipulations commands executed in successions based on intermediate results, table may be successively simplified or modified until the query is finally answered. Referring to FIG. 8, it can be seen that the table is successively modified and/or simplified, such that the table being processed by the second database manipulation command is smaller or simpler than the original table illustrated in FIG. 7, and a decision query is executed based on the last simplified table for outputting a result or answer of "TRUE".

In operation 409, answer generated in response to the decision query in operation 408 is output with evidentiary support. According exemplary aspects, the final answer to the query received in operation 401 may be provided along with each of the intermediate steps performed with each of the corresponding intermediate output or simplified table as evidentiary support for the answer output in operation 409. More specifically, each of the atomic steps included in the generated step-by-step plan in operation 403 and resulting intermediate outputs or simplified table may be provided in association with each other. As a result, at least since each of the steps are tied to evidentiary support or underlying data, which may be verified or validated, hallucinations that are common with conventional LLMs may be obviated. Moreover, at least because evidentiary support is provided for each of the intermediate steps performed for arriving at the final answer, logical steps executed by the POQ module or system may be configured to be validated, which was incapable of being performed in the conventional LLMs.

Explanation or evidentiary support may serve as an interface between artificial intelligence and humans. In this regard, non-limiting exemplary aspects of the present disclosure provides a visualization of explanations in the context of LLM-based Table QA, for example, via generating of attribution maps over the intermediate or simplified tables. Specifically, rows, columns, and cells of intermediate tables that contribute to the final answer may be highlighted. Moreover, the highlighting may be provided in different colors to distinguish various levels of importance and/or contribution. For example, one color may be used to indicate that relevant rows contain context of the decision making process, whereas another color may be used to pinpoint specific cells that directly influence a prediction of the POQ system.

Figure 5:
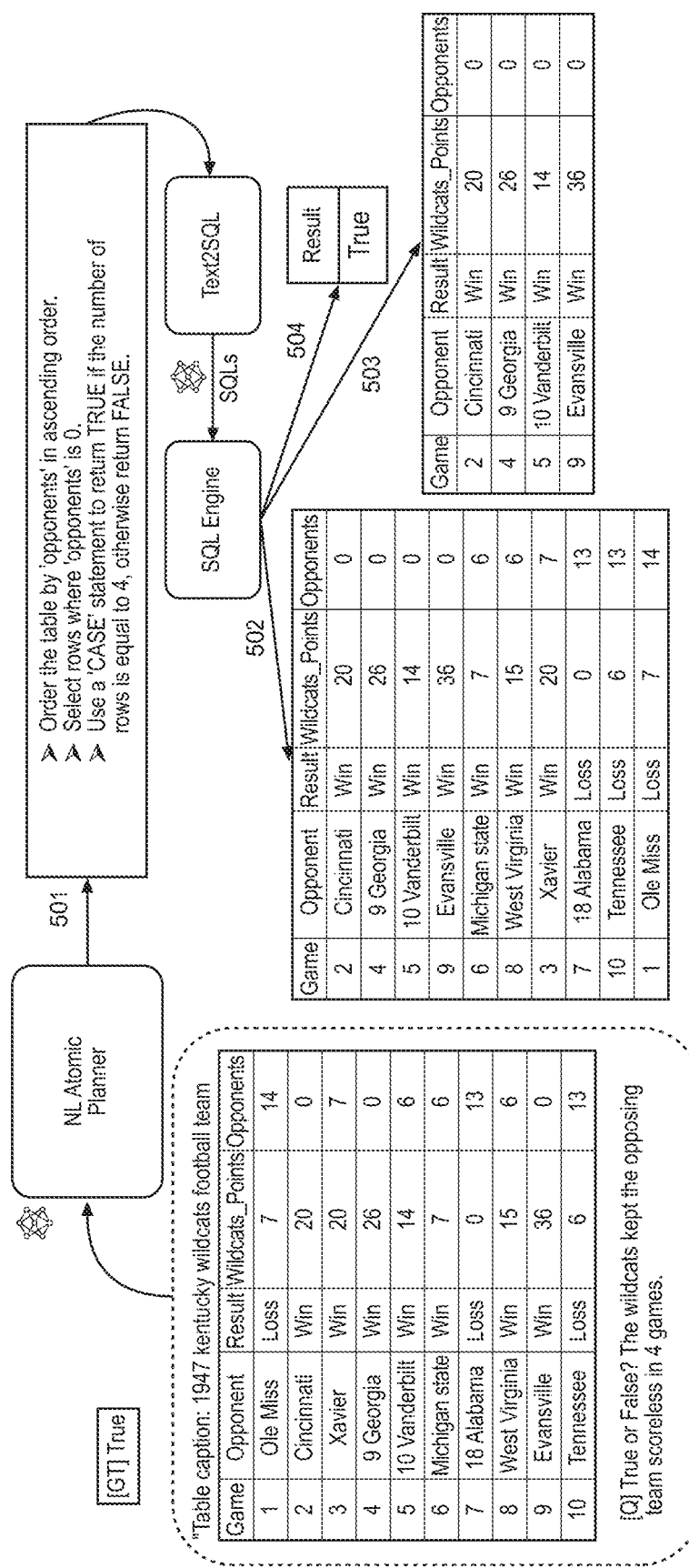
FIG. 5 illustrates a system flow of a POQ system for generating a table grounded answer that is capable of being validated to a query in accordance with an embodiment.

FIGS. 5-6 illustrate system flows of a POQ system for generating a table-based grounded and verifiable answer to a query in accordance with an embodiment.

As exemplarily illustrated in FIG. 5, a query and a corresponding table may be inputted into a natural language (NL) atomic planner module or component. The NL atomic planner module may process the received query and corresponding table to break down or decompose the received query into smaller sub-problems or sub-queries, which may be referred to as atomic steps, in operation 501. According to exemplary aspects, each atomic step may represent a simple, easily solvable transformation, such as selecting rows or filtering columns based on a condition. More specifically, an output of the NL atomic planner is a step-by-step plan that outlines the sequence of operations needed to directly answer the inputted query.

The working pipeline of the NL atomic planner includes ( ) decomposition of the query, (ii) sequential planning of the atomic steps, and (iii) providing a final output for the query. According to exemplary aspects, the decomposition of query includes breaking or decomposing of the query into a sequence of atomic steps, each atomic step representing a straightforward sub-problem. More specifically, each of the atomic step may be constrained to be limited to a single table manipulation operation or condition for ensuring clarity and to avoid potential hallucinations. For example, for the statement: True or False? The wildcats kept the opposing team scoreless in 4 games, an atomic step may be: Select rows where opponents is 0, as exemplarily illustrated in operation 503. The sequential planning of the atomic steps may involve organizing of the atomic steps in a correct order. Such sequencing allows for each atomic step to properly depend on transformations made in previous steps. Lastly, the providing of the final output involves providing a condition or data for extracting or generating the final answer to the query.

Once the NL atomic planner generates the atomic steps, Text2SQL module and SQL Engine may work together to execute the atomic steps. More specifically, each of the atomic step is converted into an executable SQL command for execution by the SQL Engine. In the regard, the Text2SQL module may leverage LLMs for converting the atomic steps into corresponding SQL commands. By breaking down the complex queries into simpler atomic steps, a more complex text-to-SQL models may not be necessary, which may reduce CPU utilization and power consumption. Instead, a lightweight SQL engine may be utilized, such as Python sqlite3 package. Usage of lightweight SQL engine may also allow application of each transformation directly to the current state of the table. Each transformation may also be saved for evidence for the modifications performed. According to exemplary aspects, unlike conventional methods that rely on black-box reasoning of LLMs for answer generation, the POQ method maintains transparency throughout the entire process. More specifically, each SQL command may correspond to a clearly defined operation, and the intermediate tables provide a tangible record of how the data is transformed at each atomic step. Such an approach may enhance interpretability, as well as easier traceability and debugging.

Once each of the atomic steps are converted into SQL commands, the SQL Engine may execute the converted SQL commands according to the specified sequential order in operations 502, 503 and 504. As illustrated in FIG. 5, operation 502 may result in a first intermediate table based on the input table, and operation 503 may be executed using the first intermediate table outputted by the operation 502 for generating a second intermediate table. Then operation 504 may be executed to generate a final answer based on the second intermediate table outputted by the operation 503. Although the above noted disclosures are described with respect to SQL, aspects of the present disclosure are not limited thereto, such that differing database manipulation commands may be utilized.

FIG. 6 similarly illustrates a system flow for a different query and table. Similar to FIG. 5, a query and a corresponding table are inputted to an atomic planner with natural language processing capabilities for generating a number of discrete atomic steps in natural language that are to be performed in a sequential order.

The discrete atomic steps provided in natural language may be converted into corresponding SQL commands, in which each SQL command may simplify or modify the inputted table or previously modified table. As illustrated in FIG. 6, the first SQL command may perform a first modification or simplification of the inputted table. The second SQL command may then perform a second modification or simplification on the first modified or simplified table. The third SQL command may then perform a third modification or simplification on the second modified or simplified table. The last or fourth SQL command may then execute a decision query based on the third modified or simplified table for generating a final output to the inputted query.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a grounded answer to a query using a corresponding table, the method comprising:
  receiving, by a processor, the query, wherein the query is provided in a natural language form;
  receiving, by the processor, the corresponding table, wherein the corresponding table includes a plurality of rows and a plurality of columns;
  decomposing, by the processor using natural language processing, the query into a plurality of atomic steps provided in natural language form, wherein the plurality of atomic steps configured to be sequentially performed;
  converting, by the processor, the plurality of atomic steps into a plurality of database manipulation commands;
  executing, by the processor, a first database manipulation command of the plurality of database manipulation commands, wherein at least one of the plurality of database manipulation commands is configured to perform a table manipulation to generate an intermediate table that is used by another database manipulation command among the plurality of database manipulation commands;
  generating, by the processor and in response to the executing of the first database manipulation command, a first intermediate table;
  storing, in a memory, the first intermediate table in association with a corresponding atomic step among the plurality of atomic steps;
  determining, by the processor whether a second database manipulation command among the plurality of database manipulation commands is a last database manipulation command among the plurality of database manipulation commands;
  when the second database manipulation command is determined not to be the last database manipulation command:
    generating, by the processor and in response to the executing of the second database manipulation command and using the first intermediate table, a second intermediate table, and
    storing, in the memory, the second intermediate table in association with a corresponding atomic step among the plurality of atomic steps;
  when the second database manipulation command is determined to be the last database manipulation command:
    setting, by the processor, the first intermediate table as a final intermediate table, and
    executing, by the processor, a decision query based on the final intermediate table for generating an answer for the query received; and
  outputting, by the processor, the generated answer along with at least the first intermediate table and the corresponding atomic step.

2. The method according to claim 1, wherein each of the plurality of atomic steps is constrained to be limited to a single table manipulation operation or condition.

3. The method according to claim 1, wherein each of the plurality of data manipulation commands is a Structured Query Language (SQL) command.

4. The method according to claim 1, wherein the other database manipulation command is subsequent to the at least one of the plurality of database manipulation commands.

5. The method according to claim 1, wherein the converting of the plurality of atomic steps into the plurality of database manipulation commands is performed using a large language model.

6. The method according to claim 1, wherein, in the outputting, the first intermediate table is provided with highlighting of at least one cell.

7. The method according to claim 1, wherein, in the outputting, each of the plurality of atomic steps is grounded with an intermediate table.

8. The method according to claim 1, wherein the first intermediate table includes a modification of the corresponding table provided to the processor.

9. The method according to claim 1, wherein the final intermediate table includes less data than the corresponding table provided to the processor.

10. The method according to claim 1, wherein the executing of the first database manipulation command is performed using a lightweight SQL engine.

11. The method according to claim 1, wherein the outputting includes generating of an attribution map over at least the first intermediate table to indicate contribution in the generating of the answer.

12. The method according to claim 11, wherein the attribution map includes highlighting of at least one row.

13. The method according to claim 11, wherein the attribution map includes at least highlighting of at least one cell.

14. The method according to claim 11, wherein the attribution map uses different highlights to indicate varying levels of importance to the generating of the answer.

15. The method according to claim 10, wherein the lightweight SQL engine includes a Python sqlite3 package.

16. The method according to claim 1, wherein the corresponding table is identified based on the query.

17. The method according to claim 1, wherein the plurality of atomic steps includes at least three atomic steps.

18. The method according to claim 1, wherein each of the plurality of database manipulation commands, except for the last database manipulation command, generates an intermediate table or further simplifies a preceding intermediate table.

19. A system for generating a grounded answer to a query using a corresponding table, the system comprising:
   a processor; and
   a memory operatively connected to the processor via a communication interface, the memory storing computer readable instructions, when executed, causes the processor to perform:
   receiving the query, wherein the query is provided in a natural language form;
   receiving the corresponding table, wherein the corresponding table includes a plurality of rows and a plurality of columns;
   decomposing, using natural language processing, the query into a plurality of atomic steps provided in natural language form, wherein the plurality of atomic steps configured to be sequentially performed;
   converting the plurality of atomic steps into a plurality of database manipulation commands;
   executing a first database manipulation command of the plurality of database manipulation commands, wherein at least one of the plurality of database manipulation commands is configured to perform a table manipulation to generate an intermediate table that is used by another database manipulation command among the plurality of database manipulation commands;
   generating, in response to the executing of the first database manipulation command, a first intermediate table;
   storing the first intermediate table in association with a corresponding atomic step among the plurality of atomic steps;
   determining whether a second database manipulation command among the plurality of database manipulation commands is a last database manipulation command among the plurality of database manipulation commands;
   when the second database manipulation command is determined not to be the last database manipulation command:
      generating, in response to the executing of the second database manipulation command, a second intermediate table, and
      storing the second intermediate table in association with a corresponding atomic step among the plurality of atomic steps;
   when the second database manipulation command is determined to be the last database manipulation command:
      setting the first intermediate table as a final intermediate table, and
      executing a decision query based on the final intermediate table for generating an answer for the query received; and
   outputting the generated answer along with at least the first intermediate table and the corresponding atomic step.

20. A non-transitory computer readable medium configured to store instructions for generating a grounded answer to a query using a corresponding table, the instructions, when executed, cause a processor to perform the following:
   receiving the query, wherein the query is provided in a natural language form;
   receiving the corresponding table, wherein the corresponding table includes a plurality of rows and a plurality of columns;
   decomposing, using natural language processing, the query into a plurality of atomic steps provided in natural language form, wherein the plurality of atomic steps configured to be sequentially performed;
   converting the plurality of atomic steps into a plurality of database manipulation commands;
   executing a first database manipulation command of the plurality of database manipulation commands, wherein at least one of the plurality of database manipulation commands is configured to perform a table manipulation to generate an intermediate table that is used by another database manipulation command among the plurality of database manipulation commands;
   generating, in response to the executing of the first database manipulation command, a first intermediate table;
   storing the first intermediate table in association with a corresponding atomic step among the plurality of atomic steps;
   determining whether a second database manipulation command among the plurality of database manipulation commands is a last database manipulation command among the plurality of database manipulation commands;
   when the second database manipulation command is determined not to be the last database manipulation command:
      generating, in response to the executing of the second database manipulation command, a second intermediate table, and
      storing the second intermediate table in association with a corresponding atomic step among the plurality of atomic steps;
   when the second database manipulation command is determined to be the last database manipulation command:
      setting the first intermediate table as a final intermediate table, and
      executing a decision query based on the final intermediate table for generating an answer for the query received; and
   outputting the generated answer along with at least the first intermediate table and the corresponding atomic step.

* * * * *